May 21, 1935.  E. MOWRY  2,002,272
DISK HARROW
Filed March 12, 1934  2 Sheets-Sheet 2
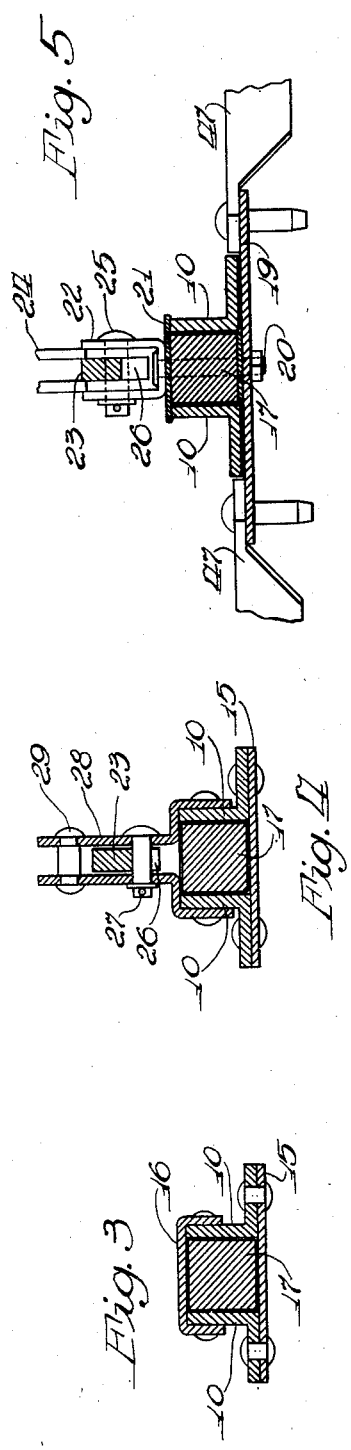
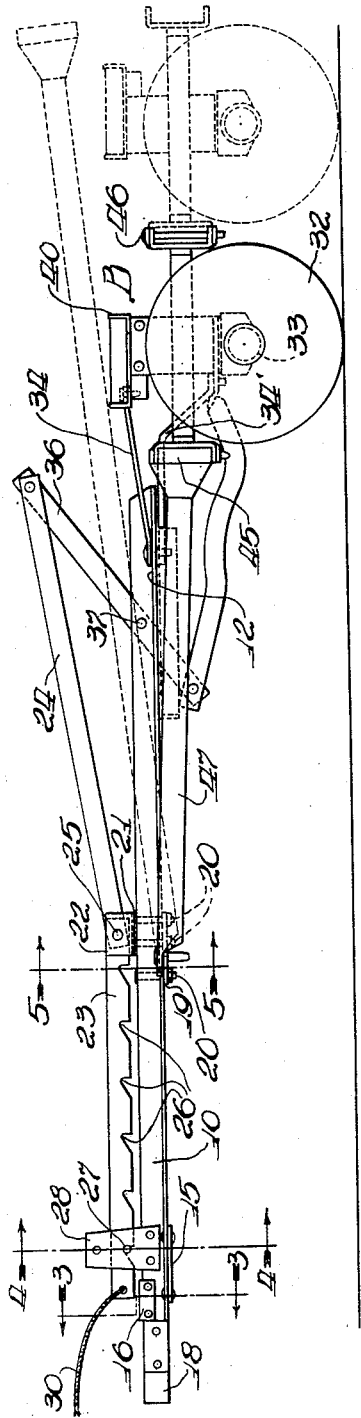
Inventor
Edward Mowry

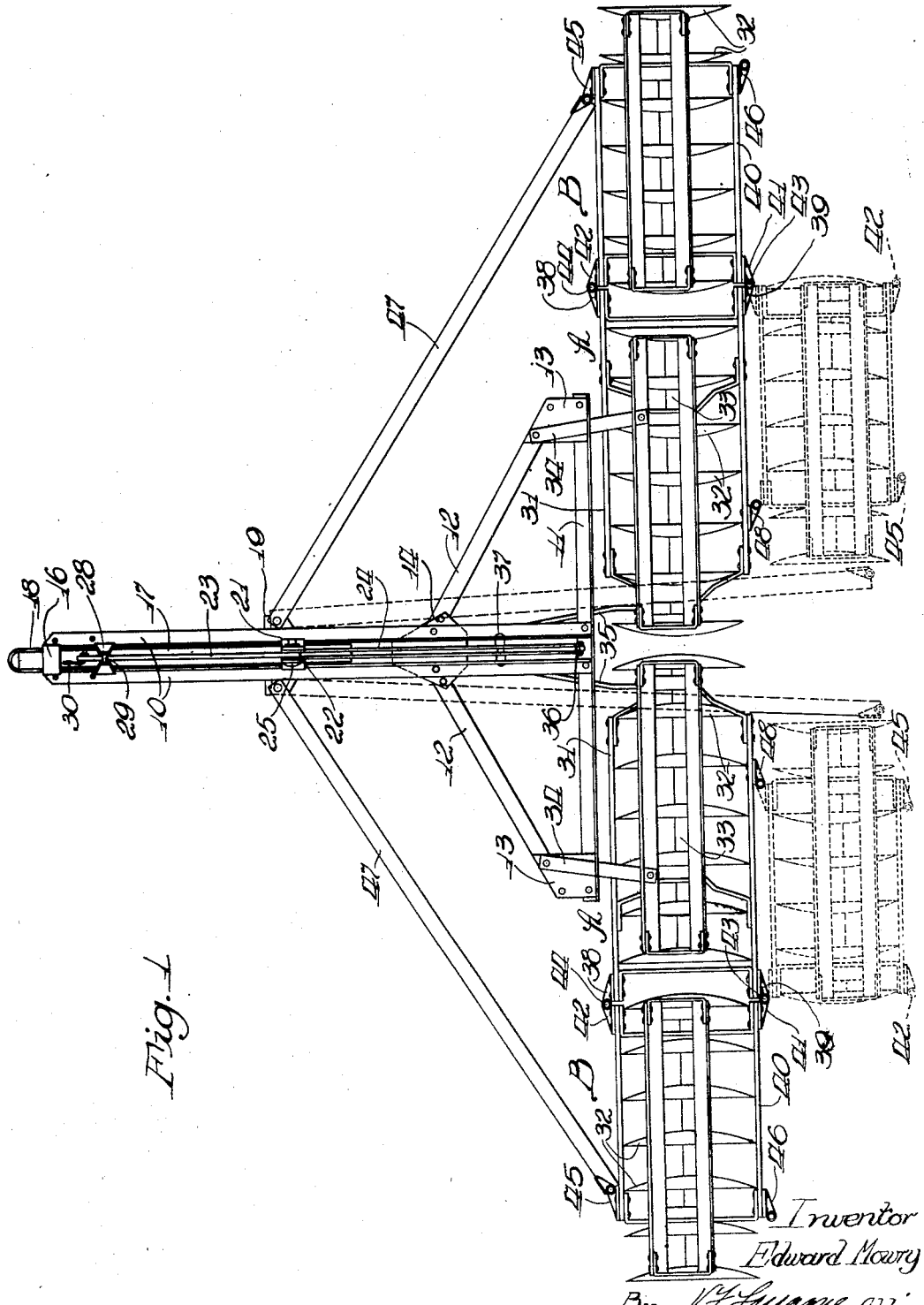

Patented May 21, 1935

2,002,272

UNITED STATES PATENT OFFICE 2,002,272

DISK HARROW

Edward Mowry, Rock Falls, Ill., assignor to International Harvester Company, a corporation of New Jersey Application March 12, 1934, Serial No. 715,045

8 Claims. (Cl. 55—81)

This invention relates to a field implement. More specifically it relates to wide type disk harrows.

The principal object of the invention is to provide in a wide type disk harrow a sectional construction permitting folding of the outer sections to reduce the width of the harrow for transport. A more specific object is to provide an improved wide type harrow construction including draft means with quick detachable connections to permit easy folding of certain portions of the harrow.

The above objects and others, which will be apparent from the detailed description to follow, are accomplished by providing a construction in which outer gangs are releasably secured to inner gangs for pivoting on vertical axes and in which the draft means for the outer gangs are readily detachable, whereby the outer sections may be swung about vertical axes to positions behind the inner sections and secured to the inner sections for transport.

In the drawings:

Figure 1 is a plan view of a wide type disk harrow in which the invention is embodied, the dotted lines showing the outer sections in collapsed, folded position;

Figure 2 is an end elevation of the harrow shown in Figure 1, the dotted lines in this figure also showing outer sections in folded transport position;

Figure 3 is a section taken on the line 3—3 of Figure 2;

Figure 4 is a section taken on the line 4—4 of Figure 2; and,

Figure 5 is a section taken on the line 5—5 of Figure 2.

The disk harrow illustrated is, generally speaking, of a somewhat conventional construction incorporating a well known power angling feature; that is, the angling of the disk gangs may be accomplished by draft power either in the fore or aft direction by proper manipulation of the locking mechanism.

The draft frame of the harrow consists of two spaced longitudinally extending angle bars 10, a transverse bar 11, to which the bars 10 are attached at their rear ends, and diagonal brace bars 12 connected to the outer ends of the bar 11 by gusset plates 13 and to a forward point on the bars 10 by a gusset plate 14. The forward ends of the bars 10, as shown in Figures 2 and 3, are connected by a bottom cross member 15 and an upper member 16. The draft frame constructed as described forms the support or attaching means for the other parts of the disk harrow.

A main draft member 17 is slidably mounted between the angle bars 10, the rear ends of said member terminating in the position of adjustment shown in Figure 1 a short distance forwardly of the gusset plate 14. A clevis 18 is secured to the forward end of the draft member 17 for the application of power.

Near the rear end of the draft member 17, a plate 19 is rigidly secured thereto and extends laterally beyond the angle bars 10. Bolts 20, which secure the plate 19 to the draft member, also secure an upper plate 21 in position. Said plate extends laterally over the top of the angle bars 10, said plates forming thereby a guide for the draft member and preventing displacement of said member. Two of the bolts 20 secure a U-shaped, upwardly extending member 22 to the draft bar. A forwardly extending bar 23 and a rearwardly extending link 24 are pivotally secured to the member 22 by a pin 25.

The member 23 is provided with a plurality of spaced notches 26, which are adapted to engage a transverse pin 27 carried by two upstanding brackets 28 secured to the angle bars 10 near their front ends. A pin 29 between the brackets 28 above the bar 23 prevents upward displacement of said bar beyond the necessary movement to engage the different notches 26 on the pin 27. A flexible element 30 connected to the forward end of the bar 23 provides means extending to the operator of the tractor for lifting the bar 23 out of engagement with the pin 27. It will be noted that the rear side of the notches 26 are perpendicular to the bar, whereby they remain latched on the pin 27 when pressure is exerted in a forward direction on the bar 23. The forward sides of the notches 26 are slanted or cammed, whereby, with the application of tension in a rearward direction on the bar 23, said bar moves rearwardly with the cammed sides of the notches ratcheting over the pin 27.

The disk gangs are sectional, as previously pointed out, consisting of inner sections A and outer sections B. The frame structures 31 of the inner gangs A are of a conventional construction having depending supports of a conventional construction which support the transverse shafts which carry the disks 32 and the spacing spools 33 positioned there-between. The construction of the gang frame structures and the mounting of the disks thereon have not been shown in detail, as they may be of any conventional construction and do not in their detailed construction comprise any part of the present invention.

Each of the frame structures 31 is connected outwardly from its center point by a bar 34 with the gusset plate 13 of the draft frame. The bar 34 is pivotally connected to the frame structure 31 and to the draft frame with a limited lateral movement and a sufficient angular limitation to provide for angling the disk gangs. Bars 34' are pivotally connected to the depending portion of the frame structure 31 substantially vertically below the point of connection of the bars 34 and to the same point of attachment on the gusset plates 13. By provision of two bars 34 and 34', the frame structure 31 is maintained in an upright position and the tendency to tip forwardly or rearwardly is overcome.

The adjacent inner end of the frame structures 31 are connected by links 35 with the lower end of a lever 36 pivoted intermediate its ends on a pin 37 carried by the draft bars 10 near the rear end thereof. The upper end of the lever 36 is pivotally connected to the link 24 previously referred to.

The frame structures 31 of the inner gangs A carry at their outer ends a bracket 38 on the forward side and a bracket 39 at the rearward side. The frame structures 40 of the outer gangs B carry corresponding brackets 41 at their rearward sides, and brackets 42 at their forward side. Each of the brackets 39 is pivotally connected to the corresponding bracket 41 by a vertical pin 43. Each of the brackets 38 is connected to the corresponding bracket 42 by a removable pin 44. At their outer ends each of the frame structures 40 is provided with a bracket 45 on its forward side and a bracket 46 on its rear side. A draft link 47 is pivotally connected to each bracket 45 and to the plate 19 previously referred to.

In the operation of the disk harrow as above described, the gangs A and B, being connected together at the rear side and at the forward side, operate as a single section. This harrow is angled by the means described as in any harrow of this type. By releasing the lever 23 and applying draft to the member 17, the outer ends of the sectional gangs are pulled forwardly by the draft links 47. At the same time the pressure is applied through the links 35 to the inner adjacent ends of the sectional gangs, whereby the gangs are angled without undue strain on their frame structures. The gangs are brought back into transverse alignment by applying rearward pressure to the draft member 17, the reverse operation taking place.

In wide type harrows, the overall width of the harrow is such that it may not be readily transported, as the width is too great for the gates and roads over which it is to be operated. Also for storage purposes it is desirable to fold the harrow, whereby less lateral width is needed to house the implement. To fold the harrow, as illustrated, the draft links 47 are detached from the brackets 45 by removing the pivot pins. The pins 44 are also removed, whereby the outer frame structures 40 are freed for pivoting about the vertical axes formed by the pins 43. Said frame structures are then swung around rearwardly about the vertical pivot axes to positions substantially parallel to the forward gangs A. The brackets 46 previously referred to are then secured to properly located brackets 48 secured to the frame structures 31 of the inner gangs A. The bars 47 are swung inwardly and laid across the frame structures of the inner gangs. To arrange the harrow for operation, the procedure is reversed, the outer frame structures 40 being swung around into position, whereby the pins 44 may be inserted and the draft members 47 may be attached.

In the drawings and in the above specification applicant has disclosed and described a particular embodiment of his improved collapsible wide type disk harrow. It is to be understood, however, that all modifications falling within the scope of the appended claims constitute the invention.

What is claimed is:

1. A field implement comprising a pair of transversely positioned inner frame structures, a pair of transversely positioned outer frame structures, soil engaging means carried by said structures, draft means connected to said frame structures, the draft means for the outer frame structures being disconnectible for folding the implement for transport, means for pivotally connecting the inner and outer frame structures together at the adjacent ends and near the rear sides of the frame structures whereby the outer frame structures may be swung around to positions parallel to and behind the inner frame structures, and means for securing said outer frame structures in said parallel position for transport.

2. A disk harrow comprising two inner units having frame structures of substantial width, two outer units having frame structures pivotally connected at their rear sides with the rear sides of the inner units and removably connected at their forward sides to the forward sides of the inner units, draft means connected to said units, the draft means for the outer units being removably connected for folding the said units about their vertical pivot axes on the inner units to positions behind and substantially parallel to the inner units, and means for securing the outer units in said parallel position for transport.

3. A disk harrow comprising a draft frame, two transversely extending disk gangs connected to said frame, two additional disk gangs pivotally connected to the outer ends of said gangs on vertical axes whereby said gangs may be swung around to positions parallel to the first mentioned gangs, and means for securing the outer gangs in said parallel position for transport.

4. A disk harrow comprising a pair of transversely positioned inner gangs, a pair of transversely positioned outer gangs, draft means connected to said gangs, the draft means for the outer gangs being disconnectible for folding the harrow for transport, means for pivotally connecting the inner and outer gangs together at the adjacent ends and near the rear sides of the gangs whereby the outer gangs may be swung around to positions parallel to and behind the inner gangs, and means for securing said outer gangs in said parallel position for transport.

5. In a disk harrow, the combination of two oppositely extending disk gangs, and draft means connected therewith, each of said gangs comprising sections pivotally connected together for relative angular movement in a horizontal plane.

6. In a disk harrow, the combination of two oppositely extending disk gangs, means for changing the angle between said gangs, each of said gangs comprising two sections flexibly connected together whereby the outer section can be swung rearwardly to a position parallel to the inner section, and means for securing the sections in said parallel position.

7. In a disk harrow, the combination of two oppositely extending disk gangs, draft means connected therewith, means for changing the angle between said gangs, each of said gangs comprising main and outer sections pivotally connected together between the ends of the sections on vertical axes whereby the outer sections may be swung rearwardly to positions parallel to the main sections, and means for securing the outer sections in said position for transport.

8. A disk harrow comprising two inner gangs having frame structures of substantial width, two outer gangs having frame structures pivotally connected at their rear sides with the rear sides of the inner sections and removably connected at their forward sides to the forward sides of the inner gangs, draft means connected to said gangs, the draft means for the outer gangs being removably connected for folding the said gangs about their vertical pivot axes on the inner gangs to positions behind and substantially parallel to the inner gangs, and means for securing the outer gangs in said parallel position for transport.

EDWARD MOWRY.